United States Patent
Krupenkin (10) Patent No.: US 8,053,914 B1
(45) Date of Patent: Nov. 8, 2011

(54) METHOD AND APPARATUS FOR ENERGY HARVESTING USING MICROFLUIDICS

(76) Inventor: Thomas Nikita Krupenkin, Middleton, WI (US)

(*) Notice: Subject to any disclaimer, the term of this patent is extended or adjusted under 35 U.S.C. 154(b) by 0 days.

(21) Appl. No.: 13/010,306

(22) Filed: Jan. 20, 2011

Related U.S. Application Data (62) Division of application No. 11/843,045, filed on Aug. 22, 2007, now Pat. No. 7,898,096.

(51) Int. Cl.
*F02B 63/04* (2006.01)
*H02K 33/00* (2006.01)
*H01L 41/00* (2006.01)

(52) U.S. Cl. .................. 290/1 R; 310/36; 310/339

(58) Field of Classification Search ............ 290/1 R; 310/339, 328, 800, 36, 309; 438/48, 51; 320/166, 101; 422/186.2; 322/2 A
See application file for complete search history.

(56) References Cited

U.S. PATENT DOCUMENTS

| | | | | |
|---|---|---|---|---|
| 1,980,873 | A * | 11/1934 | Niederreither | 204/266 |
| 3,008,334 | A * | 11/1961 | Lees | 73/503 |
| 3,167,666 | A * | 1/1965 | Janner et al. | 310/309 |
| 3,610,970 | A * | 10/1971 | Skinner | 310/10 |
| 3,906,802 | A * | 9/1975 | Nonaka et al. | 73/514.05 |
| 4,126,822 | A * | 11/1978 | Wahlstrom | 322/2 A |
| 4,705,670 | A * | 11/1987 | O'Hare | 422/186.04 |
| 4,797,566 | A * | 1/1989 | Nozaki et al. | 307/43 |
| 7,446,450 | B2 * | 11/2008 | Boland et al. | 310/309 |
| 7,608,446 | B2 * | 10/2009 | Aizenberg et al. | 435/285.2 |
| 2006/0077762 | A1 * | 4/2006 | Boland et al. | 367/170 |

* cited by examiner

Primary Examiner — Julio Gonzalez (57) ABSTRACT

An apparatus comprising a mechanical-to-electrical energy converting device having a plurality of electrodes and a fluidic body which comprises spatially separated conductive and dielectric liquid regions. Said fluidic body is configured to reversibly move as a whole with respect to said plurality of electrodes under the influence of a mechanical force. Each cycle of said reversible motion of said fluidic body causes multiple alternations of the amount of electrical charge accumulated by the electrodes, whereby generating electrical current flow between said electrodes.

6 Claims, 11 Drawing Sheets

METHOD AND APPARATUS FOR ENERGY HARVESTING USING MICROFLUIDICS

CROSS-REFERENCE TO RELATED APPLICATIONS

This application is divisional of U.S. application Ser. No. 11/843,045, filed Aug. 22, 2007 and issued a Notice of Allowance on Jan. 13, 2011.

TECHNICAL FIELD OF THE INVENTION

The present invention is directed, in general, to a device for harvesting mechanical energy and converting it into electrical energy, and methods for using and manufacturing such a device.

BACKGROUND OF THE INVENTION

A growing need to produce portable and wireless electronics with extended lifespans put constantly increasing strain on available power sources for such systems. Current mobile devices usually must be designed to include electrochemical batteries as the power source. The use of batteries can be often troublesome due to their limited capacity and lifespan, thus necessitating their periodic recharging or replacement.

One of the technologies that holds a promise to substantially alleviate current reliance on the electrochemical batteries is energy harvesting. Energy harvesting devices are designed to capture the ambient energy surrounding the electronics and convert it into usable electrical energy. The concept of energy harvesting works towards developing self-powered devices that do not require replaceable power supplies.

Many types of energy harvesters exist, each offering differing degrees of usefulness depending on the application. Perhaps the best-known energy harvesters are solar cells, which have long been used to power simple hardware components such as calculators or emergency telephones.

Another type of harvesters converts the energy contained in a vibrating object into electrical energy. These systems have been demonstrated to extract energy from floors, stairs, and equipment housings.

A third type of harvesters uses mechanical energy, such as that produced by a person walking and an object's movement. For example, some electronic watches, currently commercially available, operate by converting mechanical energy available from the swing of a person's arm to useful electrical power.

Currently the power output of energy harvesters is substantially limited by the efficiency of the energy converting transducers and the raw energy available, remaining in the microwatt to milliwatt range. However, recently, with the advent of mobile computing, the demand for more powerful energy harvesting devices with the output on the order of watts or even tens of watts has substantially increased.

In that respect, harvesters that convert mechanical energy into electrical energy are particularly promising as they can tap into high power sources such as human motion. For instance, from resting to a fast sprint, the human body expends roughly 0.1 to 1.5 kilowatt. Only part of this energy is available for harvesting, but even a modest part of this vast energy pool can constitute a substantial power source.

For instance, one of the promising ways to extract energy from people's motion is by tapping their gait. Humans typically exert up to 130 percent of their weight across their shoes at heel strike and toe-off, and standard jogging sneakers cushioned soles can compress by up to a centimeter during a normal walk. For a 154-pound person, this indicates that about 7 Watt of power could be available per foot at a 1-Hertz stride from heel strike alone. For comparison, such relatively power-hungry mobile electronic devices as mobile phones and laptops typically consume power on the order of 1 Watt and 15 Watt respectively.

Successful high-power mechanical energy harvesting requires an efficient transduction mechanism to generate electrical energy from environmental mechanical motion. One of the key requirements is to maximize the coupling between the mechanical energy source and the transduction mechanism. This is a complicated problem due to often unpredictable aperiodic nature of environmental mechanical motion and a very broad range of forces, displacements and accelerations, exhibited by this motion.

Currently there are three major types of mechanical-to-electrical energy converting devices, or transducers as they are sometimes called, namely piezoelectric, electromagnetic, and electrostatic. Each of them has their respective advantages and shortcomings, but none of them can currently provide a high-power-output solution capable of effectively coupling to a broad range of environmental mechanical motion.

In particular, piezoelectric transducers are inexpensive, lightweight, compact, have no moving parts, and can be easily incorporated in a broad range of devices. However, they require high-stress, low-displacement mechanical motion, generate high-voltage, low-current output, and have low conversion efficiency.

To the contrary, electromagnetic systems are best adapted to high-displacement, low-force mechanical motion. Their conversion efficiency can be high and the output voltage can be tuned to a broad range of values. Unfortunately, due to a high-displacement requirement they typically need additional complicated mechanical or hydraulic mechanisms to achieve effective coupling with the common types of environmental mechanical motion. This often makes such systems prohibitively bulky and expensive.

Electrostatic systems are typically inexpensive, lightweight, have high conversion efficiency and potentially a broad range of tunability in terms of allowable mechanical force and displacement. However, in currently employed systems high values of electrical field are typically required to achieve even modest levels of output power. These high values of electrical field translate into high operational and output voltages, making these electrostatic devices impractical in many applications.

Thus, there is clearly a need for a simple, compact, and efficient high-power mechanical-to-electrical energy converting device capable of combining a wide range of possible output voltages with the ability to effectively couple to environmental motion with a broad range of mechanical displacements and forces.

SUMMARY OF THE INVENTION

To address one or more of the above-discussed needs, one embodiment of the present invention is an apparatus. The apparatus comprises a mechanical-to-electrical energy-converting device. The energy-converting device comprises a plurality of electrodes and a fluidic body. Said fluidic body comprises spatially separated regions of at least one conductive and at least one dielectric liquid arranged in a predetermined alternating pattern. Said fluidic body is configured to reversibly move as a whole with respect to said plurality of electrodes under the influence of a mechanical force. Each cycle of said reversible motion of said fluidic body causes multiple alternations of the amount of electrical charge accumulated by the electrodes, whereby generating electrical current flow between said electrodes.

Another embodiment is a method that comprises generation of electrical energy from mechanical energy. Generation of electrical energy comprises reversibly moving a fluidic body comprising alternating conductive and dielectric liquid regions against electrostatic force generated by a plurality of electrically charged electrodes. Each cycle of said reversible motion causing multiple alternations of the amount of electrical charge accumulated by the electrodes, thus generating electrical current flow between said electrodes.

Still another embodiment is a method that comprises manufacturing a mechanical-to-electrical energy-converting device. One or more electrodes are disposed over at least one substrate. A fluidic body comprising a plurality of alternating conductive and dielectric liquid regions is formed and disposed in close proximity to said electrodes. Said electrodes are coupled to a circuit means for transferring electrical current generated by said energy-converting device to power consumption means.

BRIEF DESCRIPTION OF THE DRAWINGS

The invention is best understood from the following detailed description, when read with the accompanying figures. Various features may not be drawn to scale and may be arbitrarily increased or reduced in size for clarity of discussion. Reference is now made to the following descriptions taken in conjunction with the accompanying drawings, in which.

DETAILED DESCRIPTION

Present invention benefits from realization that electrostatic mechanism of converting mechanical energy into electrical energy can be greatly improved by combining it with modern microfluidics technology. A common approach to electrostatic energy conversion (e.g. disclosed in U.S. Pat. Nos. 6,936,994, 4,127,804, 6,127,812, 3,094,653, 3,013,201, 4,054,826, 6,750,590, 4,897,592, 4,126,822, 2,567,373, 3,405,334, 6,255,758, 7,112,911, 4,595,852, 4,814,657) consists of electrically charging one or more electrodes arranged in such a way as to create a strong electrical field in one or more regions in space and then reversibly moving a conductive or dielectric body against the force exerted by this field, thus causing electrical field variations in time. Since the amount of charge on the electrodes and the field strength are intimately related, electrical field variations cause charge variations, which, in turn, can be converted into useful electrical current. Charging of the electrodes can be accomplished either by external voltage source, such as electrochemical battery (e.g. as disclosed in U.S. Pat. Nos. 4,054,826, 6,936, 994), or through some internal process, such as tribo-electricity (e.g. as disclosed in U.S. Pat. No. 4,126,822), or, as proposed in one embodiment of the current invention, by spontaneous formation of electrical double-layer, similar to so called electrochemical supercapacitors.

The maximum electrical energy output that can be produced by the described energy conversion mechanism is directly proportional to the variation of the electrostatic field energy during the reversible motion of the mentioned above conductive or dielectric body. For a special case where each cycle of the reversible motion of the body causes multiple alternations of the electrostatic field energy from zero to some maximum value $E_0$, the total useful electrical energy E produced will be proportional to N $E_0$, where N is a number of electrostatic energy alternations per one cycle of reversible motion. For the simplest case of a set of electrodes having total capacity C and being maintained at a given electrical voltage differential V, electrostatic field energy $E_0$ is expressed as $E_0=0.5$ C $V^2$. Here $E_0$ is energy measured in Joules [J], V is voltage measured in Volts [V], and C is capacitance measured in Farads [F].

Thus one can conclude that the maximum useful electrical power output of the conversion device can be achieved by maximizing capacity C, applied voltage V, or number of energy alternations N. Theoretically, increasing the value of applied voltage V would be a very effective strategy as the energy $E_0$ depends on the square of V. Unfortunately, high voltages are often undesirable and can substantially restrict the range of applications of the energy-conversion technology, especially when it comes to harvesting energy from such sources as human body motion. Fortunately, the remaining two parameters: capacity C and number of energy alternations N can be increased without such adverse effects.

For two electrodes that are substantially planar and are separated by distance d that is much smaller than their size the value of capacitance C can be expressed as $C = \epsilon_0 \in A/d$, where A is the area where electrodes overlap, measured in square meters [m²], d is the distance between electrodes, measured in meters [m], $\in$ is dimensionless permittivity of the media between electrodes, and $\epsilon_0 = 8.854 \ 10^{-12}$ Farad/meter [F/m] is vacuum permittivity. Thus, the value of capacitance C can be increased either by increasing electrode area A or by decreasing distance between electrodes d. Adding more electrode area might be problematic in many applications as this would increase the size and weight of the device, but decreasing the distance d in many situations can be readily accomplished.

The following numerical example can further elucidate the above mentioned arguments. Lets us consider the energy-converting device with the electrode size consistent with the human footprint, for instance 5 cm by 7 cm, i.e. electrode area $A=35$ cm². Assuming a readily achievable by modern microfabrication techniques distance between electrodes $d=20$ nanometers [nm] and permittivity of the media between electrodes $\in = 25$ (tantalum oxide) we obtain capacitance $C=39 \ 10^{-6}$ F, or microFarad [μF]. Thus, for applied voltage $V=10$ V electrostatic energy $E_0 = 2 \ 10^{-3}$ J. This demonstrates that about 500 energy alternations per one cycle of environmental motion with 1 Hertz [Hz] frequency (e.g. human gait) are required in order to achieve theoretical power output on the order of 1 Watt, sufficient for operating such load as a mobile telephone.

Clearly, designing and fabricating a device that would satisfy the above-mentioned requirements using traditional mechanical engineering approach is extremely challenging. Not only some sort of a mechanical transducer capable of converting one cycle of environmental motion into about 500 mechanical oscillations is required, but the very requirement of preserving a 20 nm thick dielectric layer separating moving electrodes would introduce a whole gamut of reliability problems.

This is where modern microfluidics technology provides a crucial advantage. Microfluidics is a brunch of micro-fabrication which is concerned with developing means of handling small volumes of liquids. The main idea of the present invention is to employ fluidic structures potentially consisting of hundreds or even thousands of surface-tension-controlled microscopic volumes of liquids (e.g. volumes from picoliters to microliters) as movable elements in a mechanical-to-electrical energy converting device.

Figure 1:
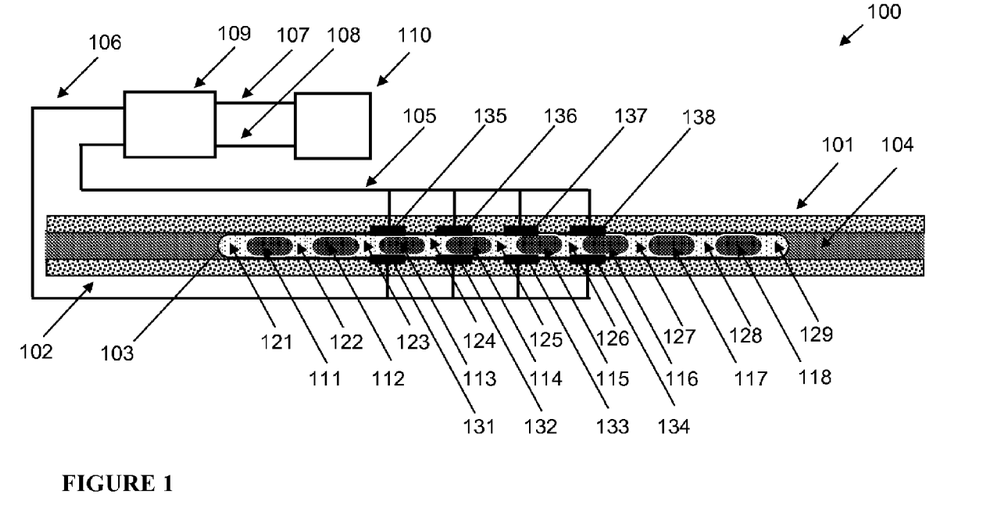
FIG. 1 presents a cross-sectional view of a first exemplary embodiment of an apparatus for converting mechanical energy into electrical energy.
Figure 2:
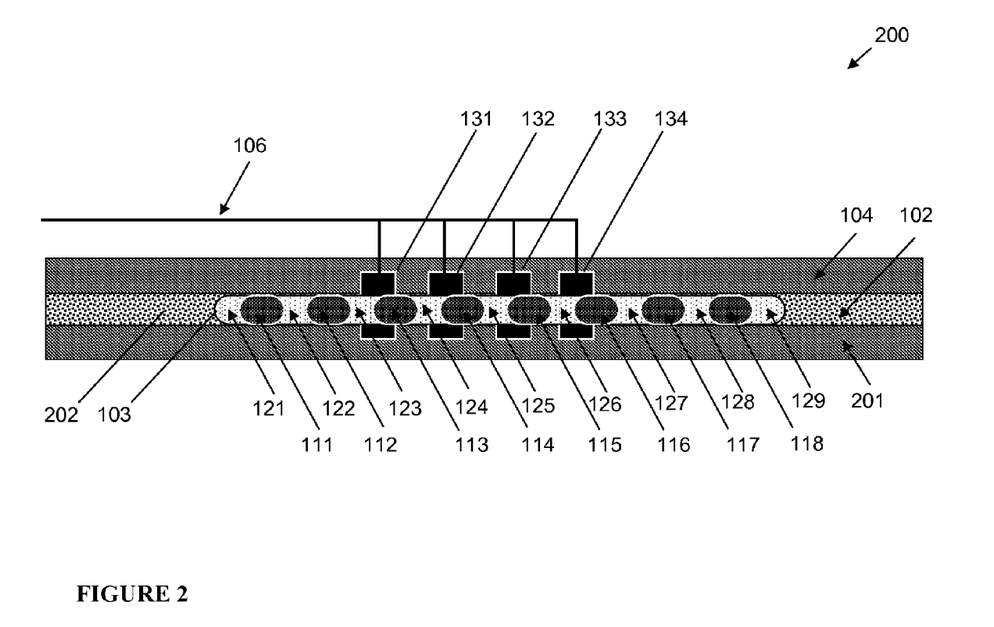
FIG. 2 presents a plan view of a part of the first exemplary embodiment of an apparatus for converting mechanical energy into electrical energy.

The invention is best understood by considering specific preferred embodiments. One embodiment of the present invention is an apparatus. FIG. 1 presents cross-sectional view of a first exemplary embodiment of an apparatus 100 for converting mechanical energy into electrical energy. FIG. 2 presents a plan view of a part 200 of the same apparatus, where parts 101, 105, 107, 108, 109, 110, 135, 136, 137, 138 of apparatus 100 are removed and spacers 104 and 201 are rendered semitransparent for the clarity of presentation. For simplicity, FIG. 1 and FIG. 2 present electrical connectors only schematically, not reflecting their actual physical arrangement.

The apparatus 100 comprises two substrates 101 and 102 disposed substantially co-planar and separated by spacers 104 and 201. Spacers 104 and 201 are disposed in such a way as to form a channel 202. A plurality of electrodes 135, 136, 137, 138 is disposed on substrate 101 and a plurality of electrodes 131, 132, 133, 134 is disposed on substrate 102. Substrates 101 and 102 and spacers 104 and 201 can be made of any solid dielectric material such as glass, textolite, or a solid plastic, including polycarbonate, polypropylene, or polytetrafluoroethylene. The electrodes 131, 132, 133, 134, 135, 136, 137, 138 can be made of any solid conductive material, such as gold or tantalum, or indium tin oxide glass. In some preferred embodiments electrodes 131, 132, 133, 134, 135, 136, 137, 138 comprise a tantalum film or a gold film.

A movable fluidic body 103 is disposed in channel 202 and configured to slide along channel 202 past electrodes 131, 132, 133, 134, 135, 136, 137, 138. Fluidic body 103 consists of two immiscible liquids, one being a dielectric liquid and the other one being an electrically conductive liquid. Examples of suitable electrically conductive liquids include aqueous salt solutions and molten salts. Exemplary aqueous salt solutions include 0.01 molar solutions of salts such as $CuSO_4$, LiCl, $KNO_3$, or NaCl. Exemplary molten salts include 1-ethyl-3-methylimidazolium tetrafluoroborate and 1-ethyl-3-methylimidazolium trifluoromethanesulfonate, which are both commercially available. In other cases the conductive liquid can comprise liquid metals such as, gallium, indium or mercury. Examples of suitable dielectric liquids include silicone oils and alkanes. Exemplary silicone oils include polydimethylsiloxane and polydiphenylsiloxane, and exemplary alkanes include nonane and heaxadecane.

Conductive and dielectric liquids are spatially separated in a plurality of distinct regions. Dielectric liquid regions 121, 122, 123, 124, 125, 126, 127, 128, 129 and conductive liquid regions 111, 112, 113, 114, 115, 116, 117, 118 are arranged in a periodic alternating pattern, such that conductive and dielectric regions regularly alternate. The boundaries between immiscible liquid regions are preserved by the surface tension forces, giving fluidic body 103 an ability to move as a whole, e.g. slide along channel 202 without disturbing the arrangement and volume of the above-mentioned distinct liquid regions.

Figure 3:
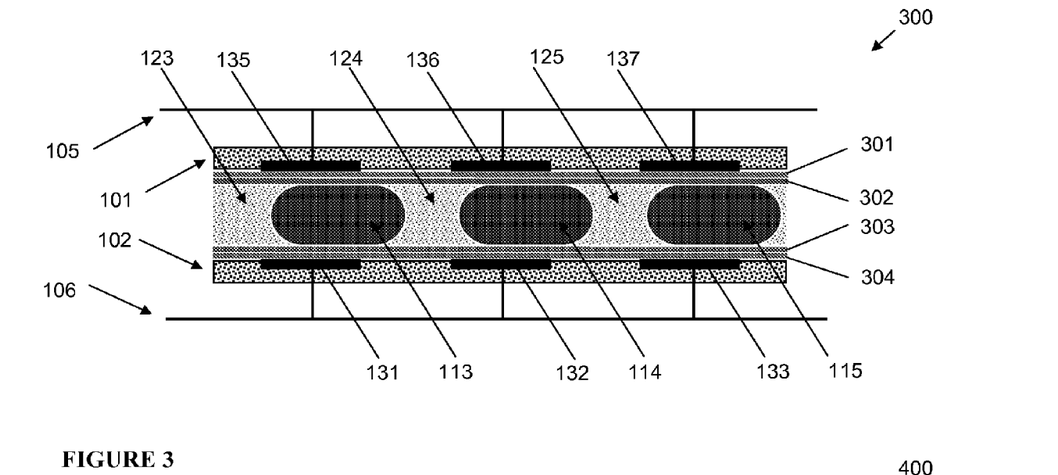
FIG. 3 presents a close-up cross-sectional view of a part of the first exemplary embodiment of an apparatus for converting mechanical energy into electrical energy.

FIG. 3 presents a close-up cross-sectional view of a part 300 of the first exemplary embodiment of an apparatus 100 for converting mechanical energy into electrical energy. It can be seen in FIG. 3 that substrate 102 and electrodes 131, 132, 133, 134 are covered by two layers 303 and 304 and that substrate 101 and electrodes 135, 136, 137, 138 is covered by layers 301 and 302. Layers 301 and 304 are made of a dielectric material and serve to electrically insulate conductive liquid regions 111, 112, 113, 114, 115, 116, 117, 118 from the electrodes 131, 132, 133, 134, 135, 136, 137, 138. Examples of suitable dielectric materials comprise any solid dielectric such as tantalum oxide and silicon oxide, or solid polymers, such as polyimide and parylene.

Figure 4:
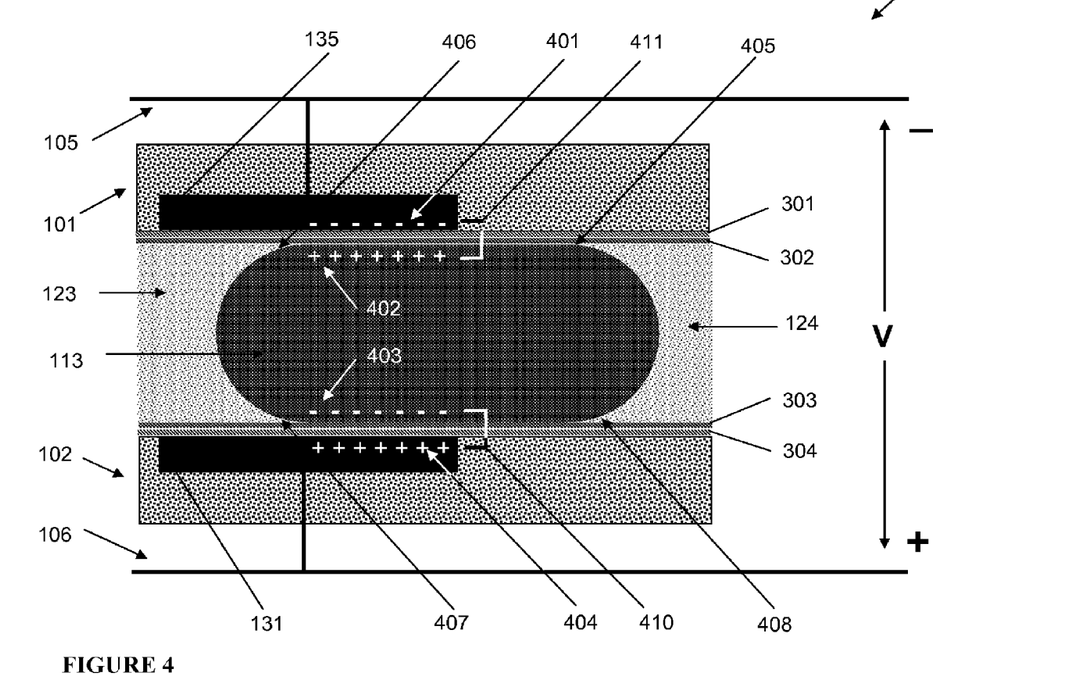
FIG. 4 presents a close-up cross-sectional view of another part of the first exemplary embodiment of an apparatus for converting mechanical energy into electrical energy.

An important factor in assuring an ability of fluidic body 103 to slide along the channel 202 is the mobility of the so-called contact lines. A contact line is defined as a line where three different phases such as a solid and two immiscible liquids meet each other. In particular, fluidic body 103 would have at least 32 separate contact lines located at the points where interfaces between conductive and dielectric liquid regions that make fluidic body 103 touch the walls of the channel 202. Four of those 32 contact line locations 405, 406, 407, 408 are indicated in FIG. 4. Contact line mobility is important because contact lines tend to get pined at the solid surface, inhibiting the motion of the liquid.

In order to decrease contact line pinning the surface of dielectric layers 301 and 304 must be smooth, clean, and compositionally homogeneous. Optionally, contact line pinning can be further reduced by disposing appropriate treatment means. One example of such treatment means is a layer of a low surface energy material disposed on top of the dielectric layers. Such low-surface-energy-material layers 302 and 303 are shown in FIG. 3 and FIG. 4.

The term low surface energy material, as used herein, refers to a material having a surface energy of about 22 dyne/cm (about $22 \times 10^{-3}$ N/m) or less. Those of ordinary skill in the art would be familiar with the methods to measure the surface energy of materials. Examples of suitable materials include fluorinated polymers like polytetrafluoroethylene. Usually the low-surface-energy material is not intended to serve as an electrical insulator and would transmit electrical current. Thus a combination of a dielectric material and a low-surface-energy material is usually required to electrically insulate conductive liquid regions 111, 112, 113, 114, 115, 116, 117, 118 from the electrodes 131, 132, 133, 134, 135, 136, 137, 138. However, in some cases, substrates 101 and 102 and electrodes 131, 132, 133, 134, 135, 136, 137, 138 can be covered with a single material, such as Cytop® (Asahi Glass Company, Limited Corp. Tokyo, Japan), a fluoropolymer that is both an electrical insulator and low surface energy material.

Another example of contact-line-pinning-reduction means is a self-assembled molecular monolayer (SAM). Examples of suitable SAM include organic thiolates, such as dodecanethiol and octanethiol, and silanes, such as trimethoxyhexadecylsilane and dodecyltriethoxysilane. Those materials are commercially available from Sigma-Aldrich Corporation of St. Louis, Mo.

Similar to low-surface-energy materials, SAM is not intended to serve as an electrical insulator and would transmit electrical current. Thus a combination of a dielectric material and SAM is usually required to electrically insulate conductive liquid regions 111, 112, 113, 114, 115, 116, 117, 118 from the electrodes 131, 132, 133, 134, 135, 136, 137, 138. However, in some cases, substrates 101 and 102 and electrodes 131, 132, 133, 134, 135, 136, 137, 138 can be covered with a single SAM layer such as SAM made of n-alkyltrichlorosilanes, with very careful control of the conditions of formation, which can serve as an electrical insulator, as disclosed in the publication of D. Vuillaume, C. Boulas, J. Collet, J. V. Davidovits, and F. Rondelez, Applied Physics Letters, volume 69, page 1646, year 1996.

Figure 11:
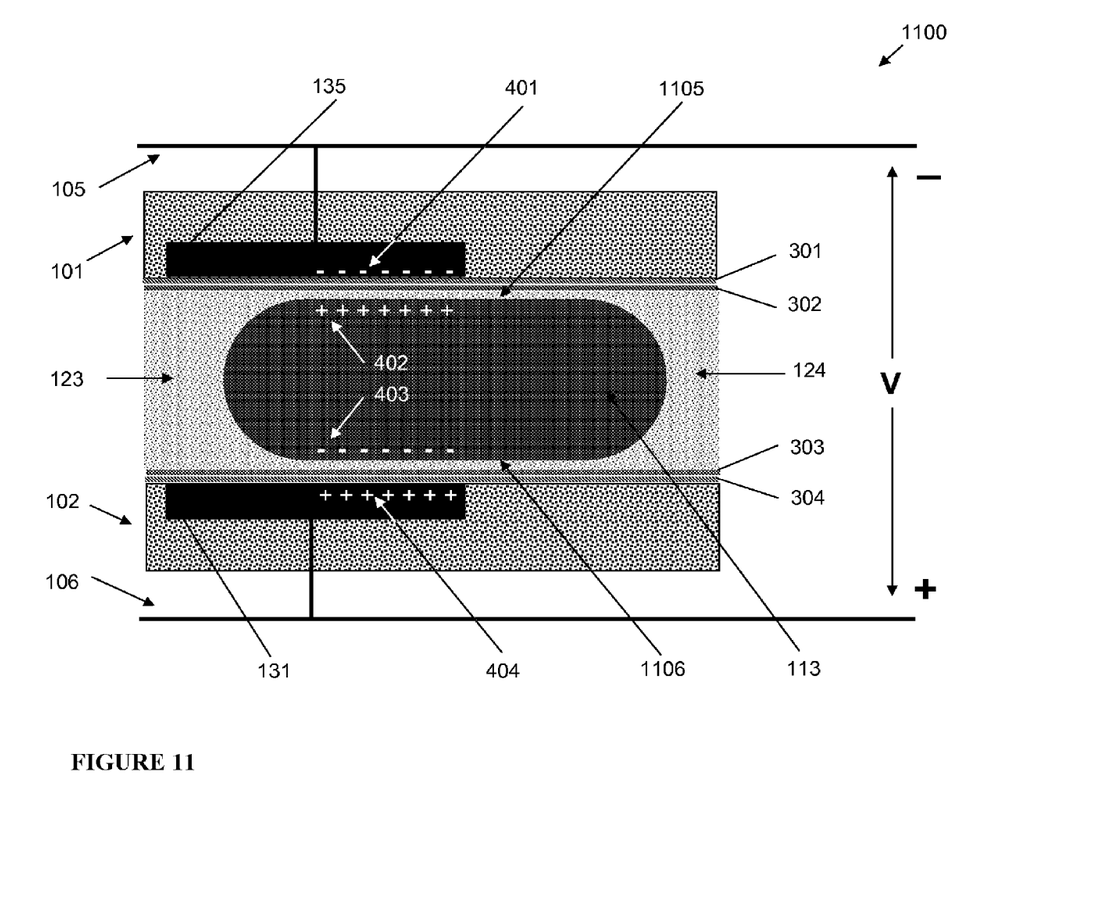
FIG. 11 presents a close-up cross-sectional view of a part of a third exemplary embodiment of an apparatus for converting mechanical energy into electrical energy.

Yet another approach to reducing contact line pinning consists of properly arranging surface tensions of conducting and dielectric liquids to allow the dielectric liquid to form less then 100 micrometer thick lubricating layers between coatings 302 and 303 and conductive liquid regions 111, 112, 113, 114, 115, 116, 117, 118. Examples of such lubricating layers 1105 and 1106 are shown in FIG. 11. This approach substantially eliminates contact line pinning as it essentially eliminates contact lines themselves, since in this arrangement conductive liquid regions do not contact solid directly. Formation of a lubrication layer between a liquid region and a solid is described in detail in U.S. Pat. No. 6,545,815, which is incorporated by reference herein in its entirety.

FIG. 4 presents a close-up cross-sectional view of a part 400 of apparatus 100, which includes only one conducting liquid region 113. FIG. 4 demonstrates that electrodes 135 and 131, together with the conducting liquid region 113 form two substantially planar electrical capacitors 410 and 411. The first capacitor 411 is formed by the liquid region 113 and the electrode 135. Layers 301 and 302 serve as a spacer for the first capacitor. The second capacitor 410 is formed by the liquid region 113 and the electrode 131. Layers 303 and 304 serve as a spacer for the second capacitor. Charges 401, 402, 403, 404 accumulated at the capacitors 410 and 411 are shown schematically in FIG. 4. Since the liquid region 113 is conductive capacitors 410 and 411 are substantially equal and electrically connected in series. Hence, their total capacitance $C_0$ is one half of their respective individual capacitance. In further discussion we will refer to the total capacitance $C_0$ associated with each pair of opposite electrodes, such as 131 and 135, without individually mentioning each of the described above capacitors, such as 410 and 411 connected in series.

The actual value of capacitance $C_0$ associated with electrodes 131 and 135 depends on the relative position of region 113 with respect to electrodes 135 and 131. When the liquid region 113 is aligned with the electrodes 135 and 131 such as to maximize the area of overlap, the capacitance reaches its maximum value. When the liquid region 113 slides away from electrodes 135 and 131 and is positioned in between the neighboring electrodes no overlap is achieved and the capacitance approaches zero.

Quite obviously the same evolution of capacitance occurs at each pair of opposite electrodes, i.e. at electrodes 131 and 135, electrodes 132 and 136, electrodes 133 and 137, and electrodes 134 and 138. Since all these pairs of electrodes are connected in parallel, one can treat the entire set of electrodes electrically coupled to connectors 105 and 106 as one variable capacitor with the total capacitance C equal to $NC_0$, where N is a number of electrode pairs, e.g. N=4 for exemplary embodiment 100. The movement of fluidic body 103 along the channel 202 causes multiple variations of the total capacitance C between zero and some maximum value $C_m$.

There are a number of methods that can be used to extract electrical energy from a variable capacitor with alternating in time capacitance and that can be adapted for use with the current invention. Some of those methods are disclosed in U.S. Pat. No. 6,936,994, 4,127,804, 6,127,812, 3,094,653, 3,013,201, 4,054,826, 6,750,590, 4,897,592, 4,126,822, 2,567,373, 3,405,334, 6,255,758, 7,112,911, 4,595,852, 4,814,657, which are incorporated by reference herein in their entirety.

For illustrative purposes we will consider here a simple method based on the use of an electrical circuit means 109, electrically coupled to electrodes 131, 132, 133, 134, 135, 136, 137, 138 through electrical connectors 105 and 106.

Electrical circuit means 109 is configured to apply bias voltage V to connectors 105 and 106 and transfer electrical current generated in response to multiple alternations in total electrical capacitance C to power consumption means 110, which is coupled to circuit means 109 through electrical connectors 107 and 108. In the described method electrical circuit means 109 is configured to switch bias voltage from zero to V each time the total capacitance C reaches its maximum value $C_m$, i.e. when the conductive liquid regions are aligned with the electrodes. The bias voltage remains switched on and equal to V as long as the total capacitance C decreases, i.e. as long as the overlap of the conductive liquid regions with the electrodes keeps decreasing. Once the total capacitance C starts to increase again the bias voltage is switched back to zero.

The total charge q accumulated by a capacitor having capacitance C and voltage differential V can be expressed as q=CV. Thus, at the first moment when the voltage V is applied to connection lines 105 and 106 the capacitor is charged and its total charge q reaches maximum value $q_m = C_m V$. At that point the total capacitor energy E reaches some value $E_1$ which is expressed as $E_1 = 0.5\, C_m\, V^2$. As time progresses and fluidic body 103 slides along the channel 202 the value of capacitance C keeps decreasing and the amount of charge q accumulated by the capacitor keeps decreasing as well, thus forcing the excess charge back through the electrical circuit means 109 and against the applied voltage V. By the time the total capacitance C approaches zero, all of the initial charge $q_m$ is forced back through the electrical circuit means 109 producing the work $E_2 = q_m V = C_m V^2$. Thus, the total energy $E_t$ generated during one alternation of the total capacitance C from zero to $C_m$ is expressed as $E_t = E_2 - E_1 = 0.5\, C_m\, V^2$ The total energy output of the apparatus 100 per one cycle of reversible motion of fluidic body 103 can be expressed as $E_{cycle} = M\, E_t$, where M is the total number of alternation of the total capacitance C per one cycle of reversible motion of fluidic body 103. The value of $E_{cycle}$ can be increased either by increasing the maximum total capacitance value $C_m$ or by increasing the total number of alternation M. The maximum capacitance value $C_m$ is proportional to the sum of the individual capacitances $C_0$ associated with each pair of electrodes. Thus, the value of $C_m$ can be increased either by increasing the total area of electrodes 131, 132, 133, 134, 135, 136, 137, 138 or by decreasing the thickness of layers 301, 302, 303, and 304 which serve as capacitor spacers. The total number of alternation M of the total capacitance C per one cycle of reversible motion of fluidic body 103 is equal to the number of conductive liquid regions in fluidic body 103 minus the total number of electrode pairs.

The described above energy-converting apparatus 100 provides a very high level of tunablity with respect to coupling to environmental motion characterized by various levels of force and displacement. By increasing the length of the fluidic body, while preserving the size of individual liquid regions, one can adjust the amount of displacement that can be handled by the apparatus 100, without affecting the force acting on the fluidic body. At the same time, by increasing the total area covered by electrodes one can adjust the level of force that can be successfully coupled to the apparatus 100, without affecting the level of possible displacements.

The power output of the apparatus 100 can be effectively increased by increasing the number of conductive liquid regions, while decreasing the thickness of layers 301, 302, 303, and 304. Of cause, in order to preserve the relative size of the liquid regions with respect to the size of electrodes, one would need to appropriately increase the total number of electrodes as well. Such increase in power can be achieved without increasing the size or weight of the apparatus 100 if the total volume of the fluidic body 103 and the total electrode area are kept constant.

To further elucidate the above arguments let us consider the same numerical example as was already discussed earlier. For the total electrode area of 5 cm×7 cm=35 $cm^2$, dielectric layer thickness of 20 nm, and the working voltage of 10 V we have estimated that about 500 capacitance alternations per one cycle of environmental motion with 1 Hertz [Hz] frequency (e.g. human gait) are required in order to achieve theoretical power output on the order of 1 Watt, sufficient for operating such load as a mobile telephone.

Assuming that the length of the fluidic body 103 is three times that of the electrode area (i.e. 3×7 cm=21 cm) one can estimate that the number of required conductive liquid regions per fluidic body is 1.5 times the number of required capacitance alternations, i.e. about 750. Since dielectric and conductive liquid regions alternate, the total number of liquid regions in fluidic body 103 is 2×750=1500. Thus the length of each liquid region is about 21 cm/1500=140 micrometers. Assuming that the channel 202 has a square cross-section with the size of 100 micrometers we arrive to the typical volume of one liquid region on the order of 1.4 nanoliters. Such volumes of liquids are routinely handled in modern microfluidic devices. The total number of channels required to cover the whole available electrode area is on the order of 5 cm/100 micrometers=500. Again, parallel operation of hundreds and even thousands of channels was experimentally demonstrated in a number of modern microfluidic devices.

Figure 5:
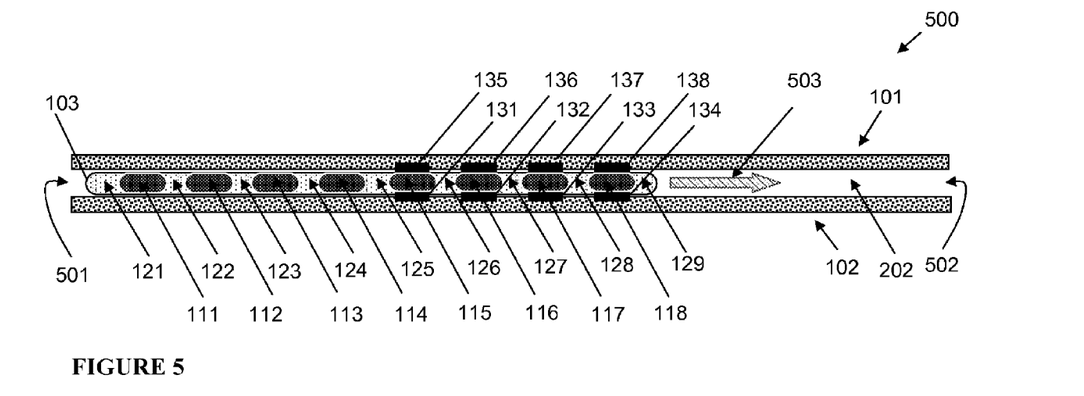
FIG. 5 presents a cross-sectional view of a part of the first exemplary embodiment of an apparatus for converting mechanical energy into electrical energy at the beginning of the reversible motion cycle.
Figure 6:
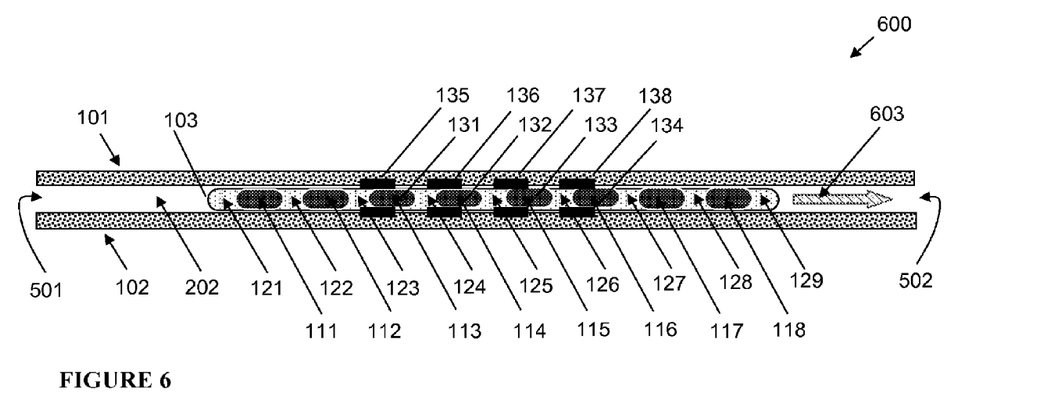
FIG. 6 presents a cross-sectional view of a part of the first exemplary embodiment of an apparatus for converting mechanical energy into electrical energy at the intermediate state of the reversible motion cycle.
Figure 7:
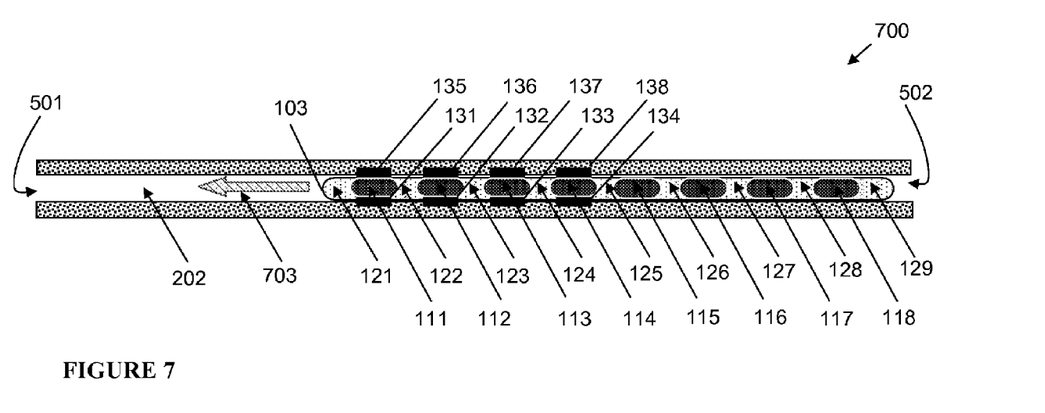
FIG. 7 presents a cross-sectional view of a part of the first exemplary embodiment of an apparatus for converting mechanical energy into electrical energy at the end of the reversible motion cycle.

Actuation of the fluidic body 103 in the energy-converting apparatus 100 can be achieved by a number of means. FIGS. 5, 6, and 7 present cross-sectional view of a part of one exemplary embodiment of apparatus 100 where actuation of the fluidic body 103 is achieved by external application of a hydrostatic pressure. FIG. 5 presents cross-sectional view of a part 500 of an exemplary embodiment of apparatus 100 at the beginning of the reversible motion cycle. At this point hydrostatic pressure at the entrance 501 of the channel 202 is higher than the hydrostatic pressure at the exit 502 of the channel 202. As the result the fluidic body 103 initiates sliding motion towards the channel exit 502, as indicated schematically by arrow 503. FIG. 6 presents cross-sectional view of a part 600 of one exemplary embodiment of apparatus 100 at the intermediate state of the reversible motion cycle. At this point hydrostatic pressure at the entrance 501 of the channel 202 is still higher than the hydrostatic pressure at the exit 502 of the channel 202. As the result the motion of the fluidic body 103 towards channel exit 502 continues, as indicated schematically by arrow 603. FIG. 7 presents cross-sectional view of a part 700 of one exemplary embodiment of apparatus 100 at the final stage of the reversible motion cycle. At this point hydrostatic pressure at the entrance 501 of the channel 202 is lower than the hydrostatic pressure at the exit 502 of the channel 202. As the result the direction of motion of the fluidic body 103 is reversed and it initiates motion towards channel entrance 501, as indicated schematically by arrow 703.

Figure 8:
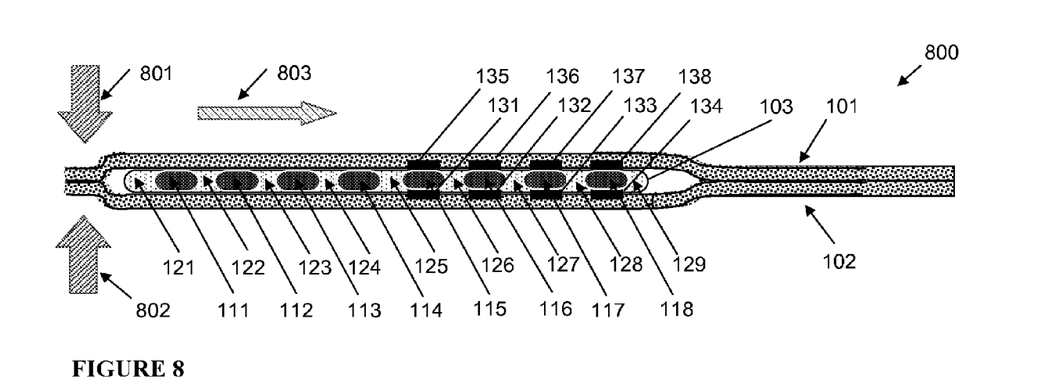
FIG. 8 presents a cross-sectional view of a part of a second exemplary embodiment of an apparatus for converting mechanical energy into electrical energy at the beginning of the reversible motion cycle.
Figure 9:
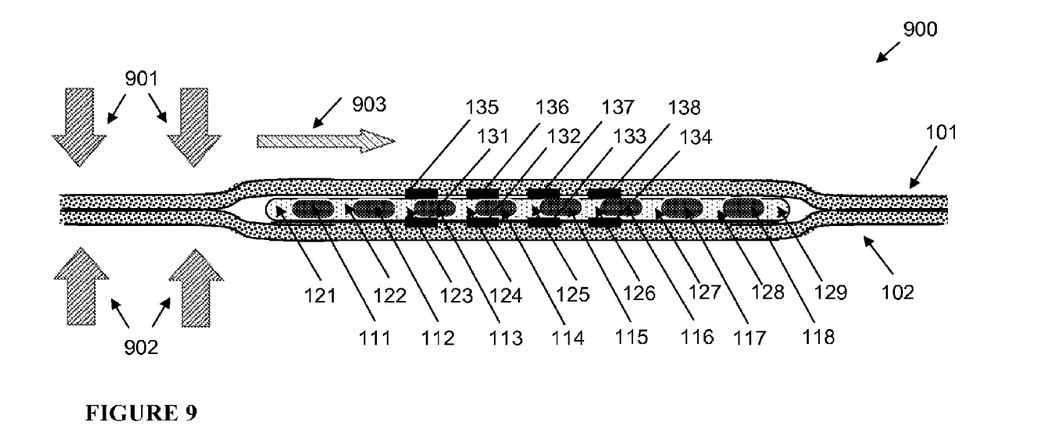
FIG. 9 presents a cross-sectional view of a part of the second exemplary embodiment of an apparatus for converting mechanical energy into electrical energy at the intermediate state of the reversible motion cycle.
Figure 10:
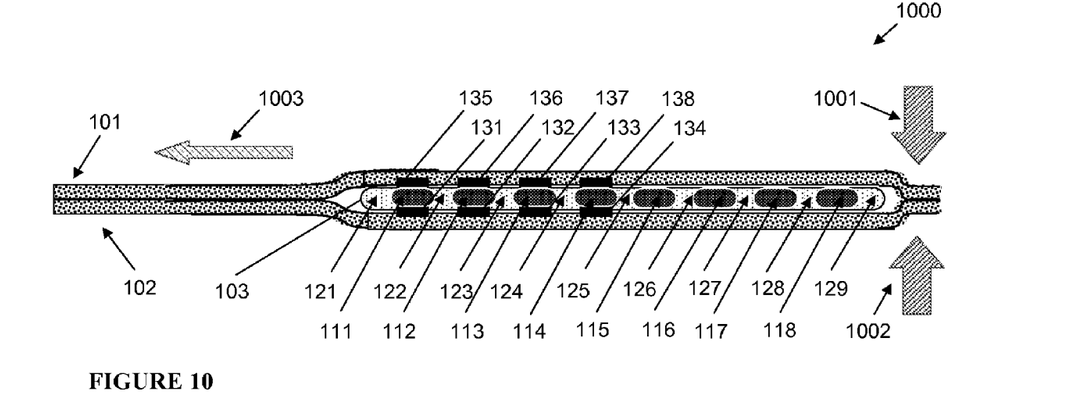
FIG. 10 presents a cross-sectional view of a part of the second exemplary embodiment of an apparatus for converting mechanical energy into electrical energy at the end of the reversible motion cycle.

FIGS. 8, 9, and 10 present cross-sectional view of a part of a second exemplary embodiment of apparatus 100 where actuation of the fluidic body 103 is achieved by decreasing the volume available for at least a part of fluidic body 103. This can be accomplished by squeezing the substrates 101 and 102 together by the action of external pressure. In this case substrates 101 and 102 can be made of thin sheets of flexible plastics, such as polypropylene or polytetrafluoroethylene.

FIG. 8 presents cross-sectional view of a part 800 of the second exemplary embodiment of apparatus 100 at the beginning of the reversible motion cycle. Arrows 801 and 802 schematically indicate applied pressure, and arrow 803 schematically indicates the direction of motion of fluidic body 103. FIG. 9 presents cross-sectional view of a part 900 of the second exemplary embodiment of apparatus 100 at the intermediate state of the reversible motion cycle. Arrows 901 and 902 schematically indicate applied pressure, and arrow 903 schematically indicates the direction of motion of fluidic body 103. FIG. 10 presents cross-sectional view of a part 1000 of the second exemplary embodiment of apparatus 100 at the final state of the reversible motion cycle. Arrows 1001 and 1002 schematically indicate applied pressure, and arrow 1003 schematically indicates the direction of motion of fluidic body 103. Of cause, many other methods to actuate fluidic body 103 exist, including the action of gravity or acceleration.

Figure 12:
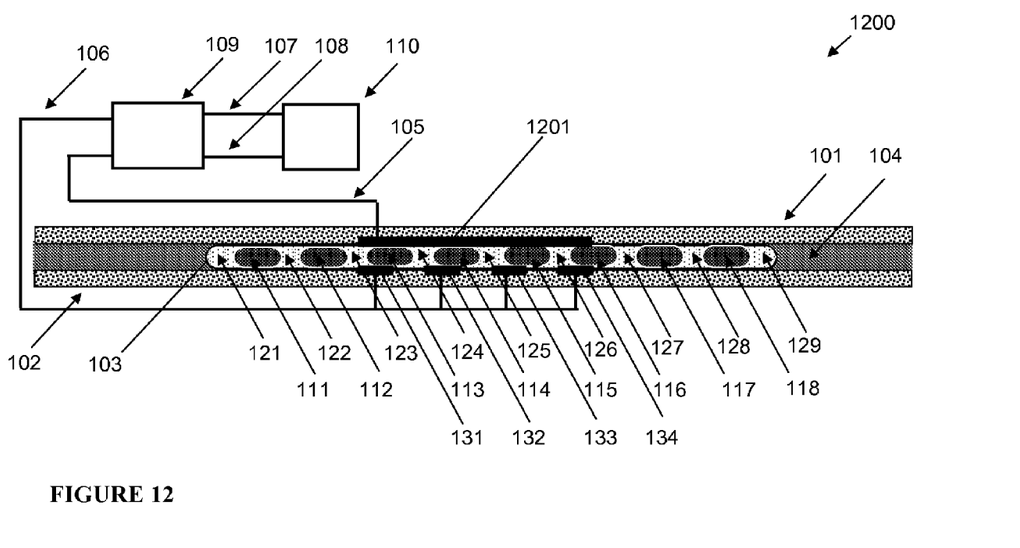
FIG. 12 presents a cross-sectional view of a forth exemplary embodiment of an apparatus for converting mechanical energy into electrical energy.
Figure 13:
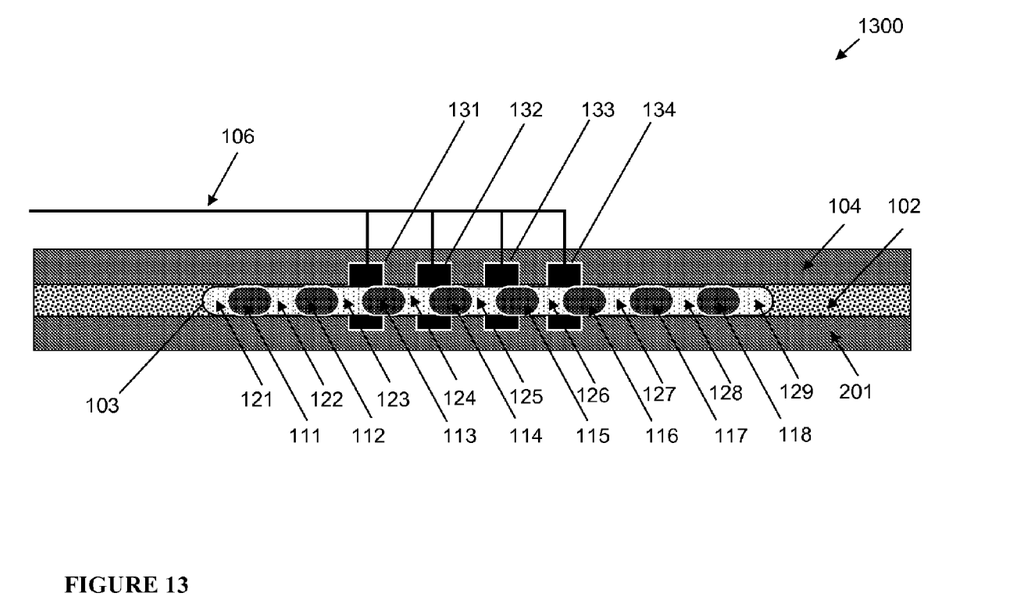
FIG. 13 presents a plan view of a part of the forth exemplary embodiment of an apparatus for converting mechanical energy into electrical energy.

FIG. 12 presents cross-sectional view of a forth exemplary embodiment 1200 of an apparatus for converting mechanical energy into electrical energy. FIG. 13 presents a plan view of a part 1300 of the same apparatus, where parts 101, 105, 107, 108, 109, 110, 1201 of apparatus 1200 are removed and spacers 104 and 201 are rendered semitransparent for the clarity of presentation. For simplicity, FIG. 12 and FIG. 13 present electrical connectors only schematically, not reflecting their actual physical arrangement.

Figure 14:
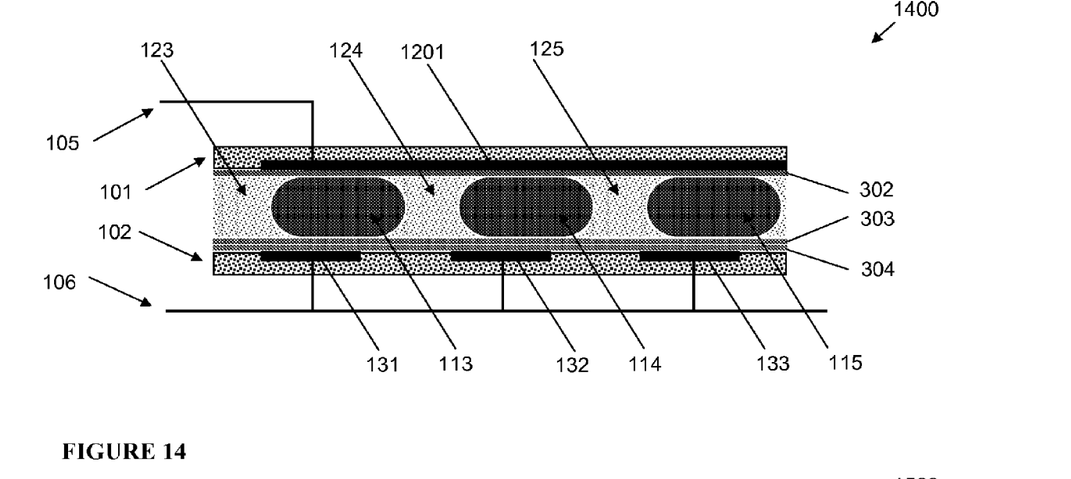
FIG. 14 presents a close-up cross-sectional view of a part of the forth exemplary embodiment of an apparatus for converting mechanical energy into electrical energy.
Figure 15:
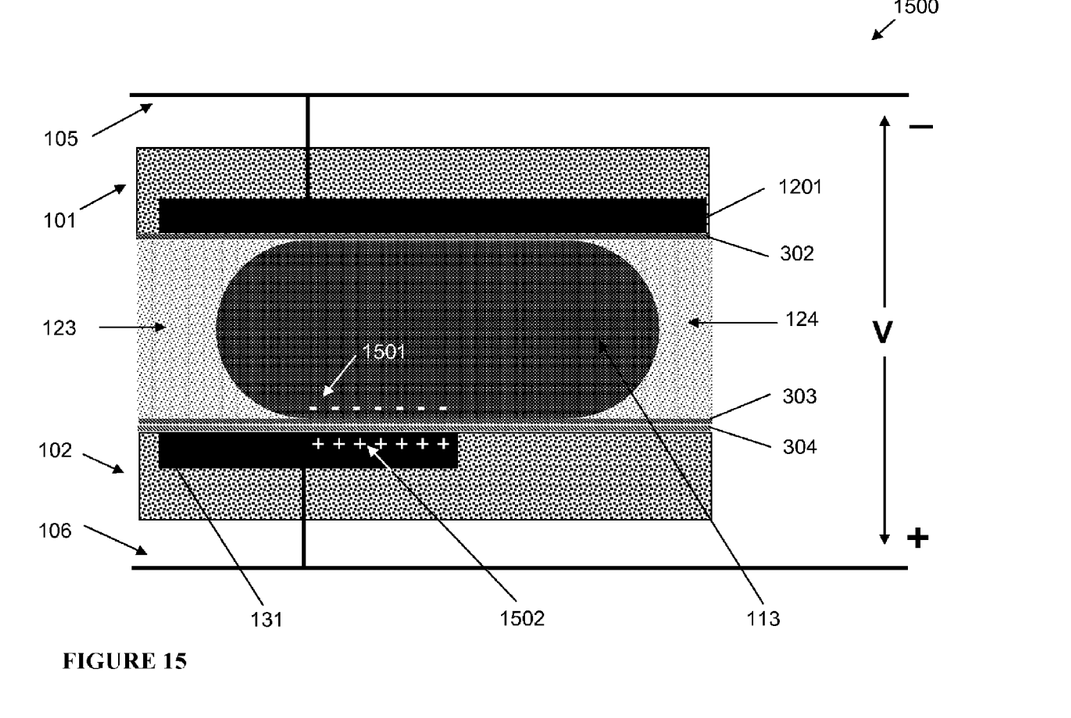
FIG. 15 presents a close-up cross-sectional view of another part of the forth exemplary embodiment of an apparatus for converting mechanical energy into electrical energy.

The main difference between apparatus 1200 and previously described apparatus 100 is the absence of separate electrodes 135, 136, 137, 138 disposed on substrate 101. Instead, one common electrode 1201 is disposed on substrate 101. FIG. 14 presents a close-up cross-sectional view of a part 1400 of apparatus 1200. It can be seen in FIG. 14 that substrate 101 and electrode 1201 are covered by only one layer 302, while substrate 102 and electrodes 131, 132, 133, 134 is covered by two layers 303 and 304. The layer 302 represents contact-line-pinning-reduction means, as discussed above, and is not configured to provide any electrical insulation between electrode 1201 and liquid regions 113, 114, 115, 116, 117, 118. As the result the liquid regions 113, 114, 115, 116, 117, 118 remains in electrical contact with electrode 1201 forming an electrical capacitor with charges accumulated at the interface between the liquid regions and the electrodes 131, 132, 133, 134. Two examples of those charges 1501 and 1502 are shown in FIG. 15. One of the advantages of such arrangement is a higher capacitance per one electrode, as only one capacitor per electrode is present, unlike the case of apparatus 100 where two capacitors in series per one electrode are present. Otherwise apparatus 1200 is similar to apparatus 100, including various available methods of energy extraction and fluidic body actuation.

Figure 16:
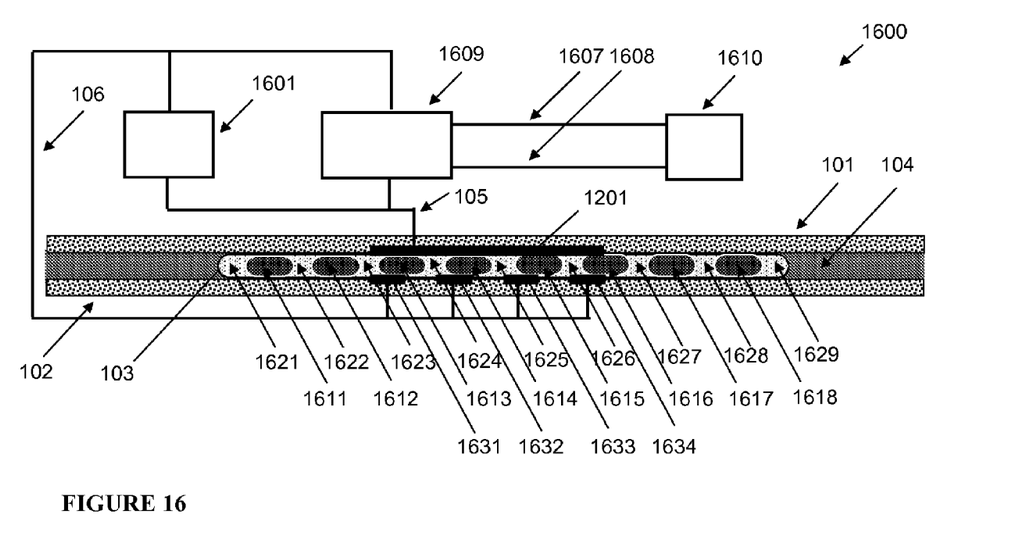
FIG. 16 presents a cross-sectional view of a fifth exemplary embodiment of an apparatus for converting mechanical energy into electrical energy.
Figure 17:
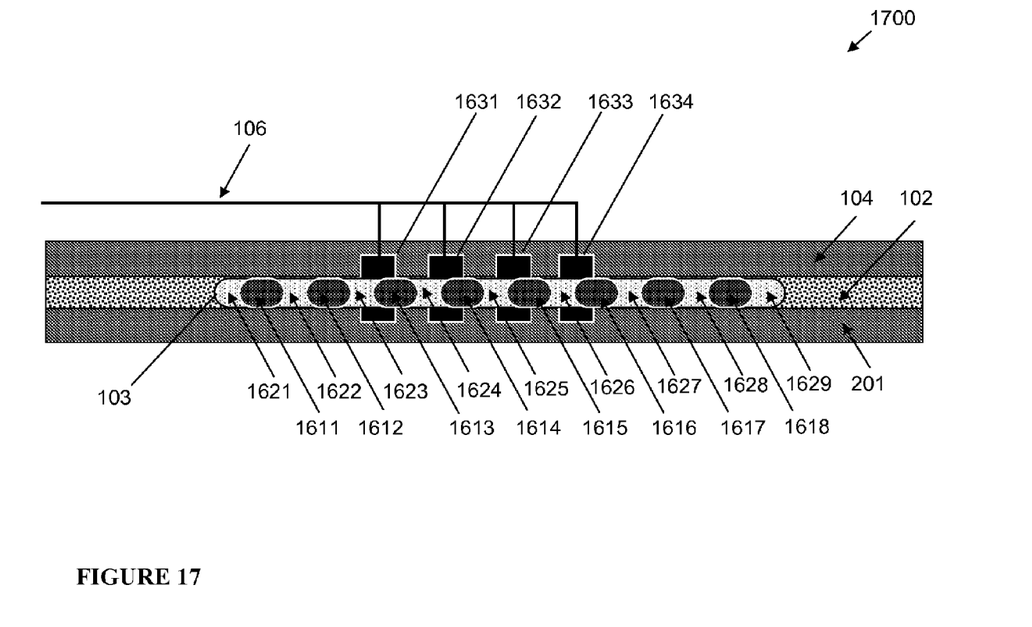
FIG. 17 presents a plan view of a part of the fifth exemplary embodiment of an apparatus for converting mechanical energy into electrical energy.

FIG. 16 presents cross-sectional view of a fifth exemplary embodiment 1600 of an apparatus for converting mechanical energy into electrical energy. FIG. 17 presents a plan view of a part 1700 of the same apparatus, where parts 101, 105, 1607, 1608, 1609, 1610, 1201 of apparatus 1600 are removed and spacers 104 and 201 are rendered semitransparent for the clarity of presentation. For simplicity, FIG. 16 and FIG. 17 present electrical connectors only schematically, not reflecting their actual physical arrangement.

The arrangement of apparatus 1600 is similar to that of apparatus 1200. The apparatus 1600 comprises two substrates 101 and 102 disposed substantially co-planar and separated by spacers 104 and 201. Spacers 104 and 201 are disposed in such a way as to form a channel 202. One common electrode 1201 is disposed on substrate 101 and a plurality of electrodes 1631, 1632, 1633, 1634 is disposed on substrate 102. Similar to apparatus 1200 and apparatus 100 substrates 101 and 102 and spacers 104 and 201 can be made of any solid dielectric material such as glass, textolite, or a solid plastic, including polycarbonate, polypropylene, or polytetrafluoroethylene.

A movable fluidic body 103 is disposed in channel 202 and configured to slide along channel 202 past electrodes 1631, 1632, 1633, 1634. Fluidic body 103 consists of two immiscible liquids, one being a dielectric liquid and the other one being an electrically conductive liquid. Examples of suitable dielectric liquids include silicone oils and alkanes. Exemplary silicone oils include polydimethylsiloxane and polydiphenylsiloxane, and exemplary alkanes include nonane and heaxadecane.

Conductive and dielectric liquids are spatially separated in a plurality of distinct regions. Dielectric liquid regions 1621, 1622, 1623, 1624, 1625, 1626, 1627, 1628, 1629 and conductive liquid regions 1611, 1612, 1613, 1614, 1615, 1616, 1617, 1618 are arranged in a periodic alternating pattern, such that conductive and dielectric regions regularly alternate. The boundaries between immiscible liquid regions are preserved by the surface tension forces, giving fluidic body 103 an ability to move as a whole, e.g. slide along channel 202 without disturbing the arrangement and volume of the above-mentioned distinct liquid regions.

Figure 18:
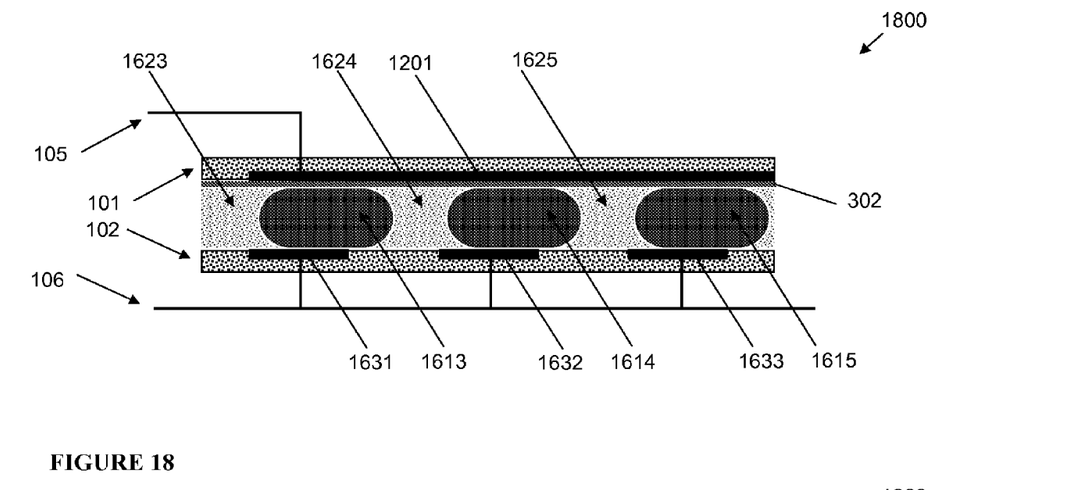
FIG. 18 presents a close-up cross-sectional view of a part of the fifth exemplary embodiment of an apparatus for converting mechanical energy into electrical energy.

FIG. 18 presents a close-up cross-sectional view of a part 1800 of apparatus 1600. It can be seen in FIG. 18 that substrate 101 and electrode 1201 are covered only by a contact-line-pinning-reduction layer 302, while substrate 102 and electrodes 1631, 1632, 1633, 1634 are not covered by anything at all.

Figure 19:
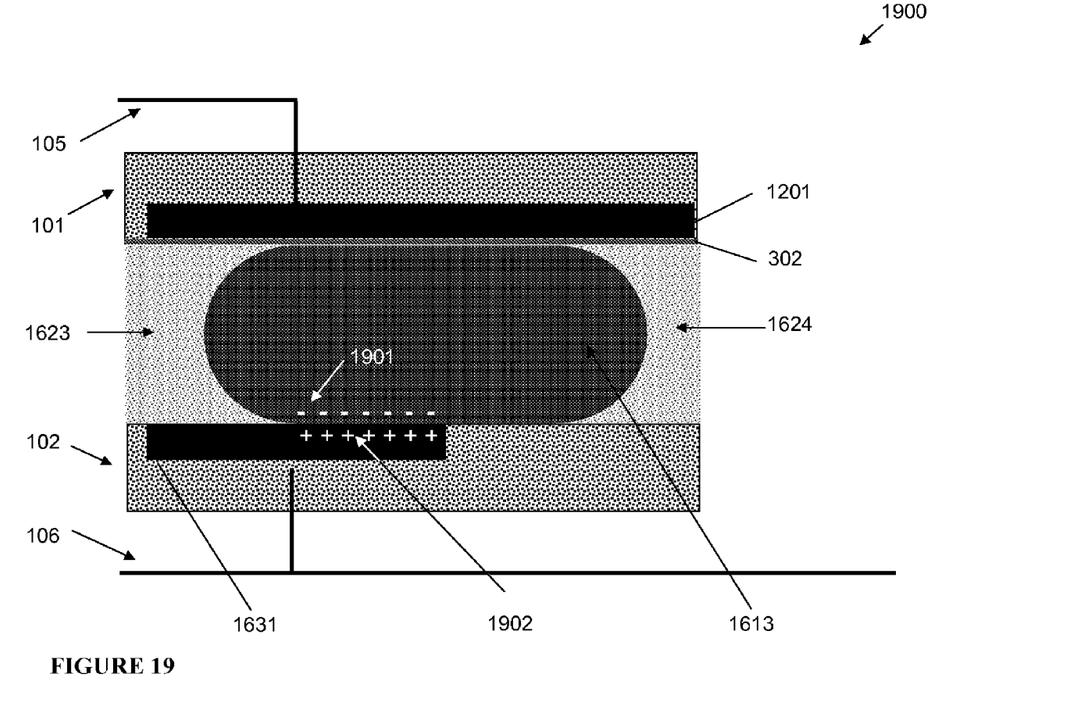
FIG. 19 presents a close-up cross-sectional view of another part of the fifth exemplary embodiment of an apparatus for converting mechanical energy into electrical energy.

The main difference between apparatus 1600 and apparatus 1200 is that apparatus 1600 does not require any specially arranged bias voltage between connectors 105 and 106 in order to operate. In apparatus 1600 the electrode material and the conductive liquid material are selected in such a way as to allow spontaneous formation of electrically charged double-layer 1901 and 1902 as shown schematically in FIG. 19. The formed double-layer prevents electrical current flow between the conductive liquid region 1901 and electrode 1902 thus forming a so-called electrochemical supercapacitor. Electrochemical supercapacitors are extensively discussed in scientific literature, including the book of B. E. Conway, Electrochemical Supercapacitors, Kliwer Academic, 1999. Those of ordinary skill in the art would be familiar with supercapacitors and the phenomenon of double-layer formation.

As mentioned above, appropriately selected electrode and conductive liquid materials are required to form a charged double-layer. The preferred electrode materials include pure carbon, or noble metals such as gold or platinum. In some preferred embodiments electrodes 1631, 1632, 1633, 1634, comprise a platinum film or a gold film. Examples of suitable electrically conductive liquids include aqueous salt solutions, and aqueous acid solutions. Exemplary aqueous salt solutions include 0.01 molar solutions of $CuSO_4$ or AgCl. Exemplary aqueous acid solutions include 0.01 molar solutions of $H_2SO_4$ or HCl.

Methods that can be used to extract electrical energy from apparatus 1600 are similar to those discussed in conjunction with apparatus 100. The main difference is that electrical circuit means 1609 is not configured to apply bias voltage V to connectors 105 and 106 and serves only to transfer generated electrical current to power consumption means 1610, which is coupled to circuit means 1609 through electrical connectors 1607 and 1608. Optionally, an additional electrical circuit means 1601 can be used to provide external bias voltage V to connectors 105 and 106, thus increasing the amount of charge accumulated by electrodes 1631, 1632, 1633, and 1634.

Figure 20:
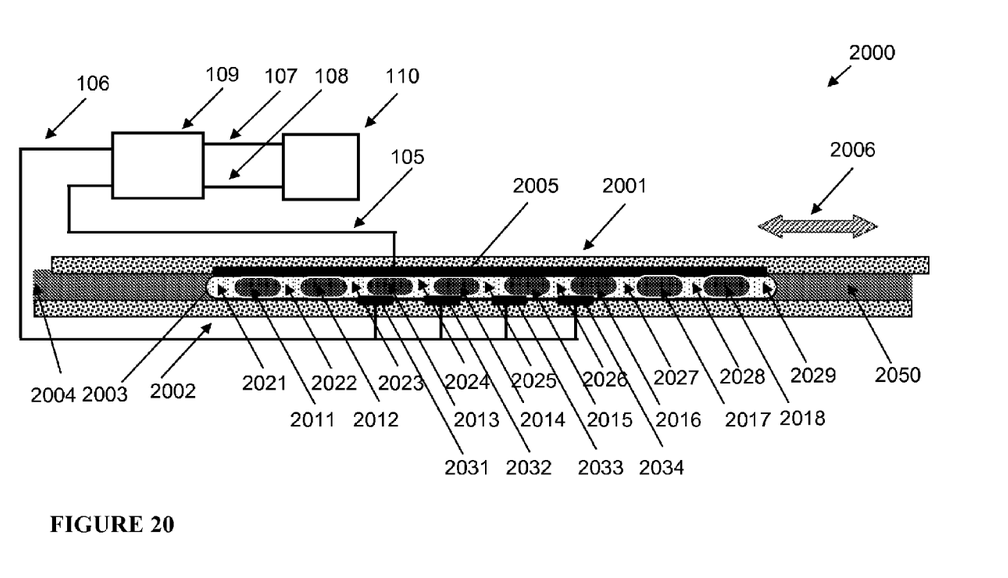
FIG. 20 presents a cross-sectional view of a sixth exemplary embodiment of an apparatus for converting mechanical energy into electrical energy.

FIG. 20 presents cross-sectional view of a sixth exemplary embodiment 2000 of an apparatus for converting mechanical energy into electrical energy. For simplicity, FIG. 20 present electrical connectors only schematically, not reflecting their actual physical arrangement.

The arrangement of apparatus 2000 is similar to that of apparatus 1200. The apparatus 2000 comprises two substrates 2001 and 2002 disposed substantially co-planar and separated by a spacer 2004. Spacer 2004 is arranged in such a way as to form a channel 2050. One common electrode 2005 is disposed on substrate 2001 and a plurality of electrodes 2031, 2032, 2033, 2034 is disposed on substrate 2002. Similar to apparatus 1200 and apparatus 100 substrates 2001 and 20202 and a spacer 2004 can be made of any solid dielectric material such as glass, textolite, or a solid plastic, including polycarbonate, polypropylene, or polytetrafluoroethylene.

Fluidic body 2003 consists of two immiscible liquids, one being a dielectric liquid and the other one being an electrically conductive liquid. Examples of suitable dielectric liquids include silicone oils and alkanes. Exemplary silicone oils include polydimethylsiloxane and polydiphenylsiloxane, and exemplary alkanes include nonane and heaxadecane. Examples of suitable electrically conductive liquids include aqueous salt solutions and molten salts. Exemplary aqueous salt solutions include 0.01 molar solutions of salts such as $CuSO_4$, $LiCl$, $KNO_3$, or $NaCl$. Exemplary molten salts include 1-ethyl-3-methylimidazolium tetrafluoroborate and 1-ethyl-3-methylimidazolium trifluoromethanesulfonate, which are both commercially available. In other cases the conductive liquid can comprise liquid metals such as, gallium, indium or mercury.

Conductive and dielectric liquids are spatially separated in a plurality of distinct regions. Dielectric liquid regions 2021, 2022, 2023, 2024, 2025, 2026, 2027, 2028, 2029 and conductive liquid regions 2011, 2012, 2013, 2014, 2015, 2016, 2017, 2018 are arranged in a periodic alternating pattern, such that conductive and dielectric regions regularly alternate. The boundaries between immiscible liquid regions are preserved by the surface tension forces, giving fluidic body 2003 an ability to move as a whole, i.e. without disturbing the arrangement and volume of the above-mentioned distinct liquid regions.

The main difference between apparatus 2000 and previously considered apparatus 1200 is that in apparatus 2000 fluidic body 2003 is permanently attached to substrate 2001 by the action of surface tension forces. Substrate 2001 is adapted to slide with respect to substrate 2002 as schematically indicated in FIG. 20 by arrow 2006. Thus the fluidic body 2003 is capable of moving past electrodes 2031, 2032, 2033, 2034 in pretty much the same way as is in apparatus 1200.

Figure 21:
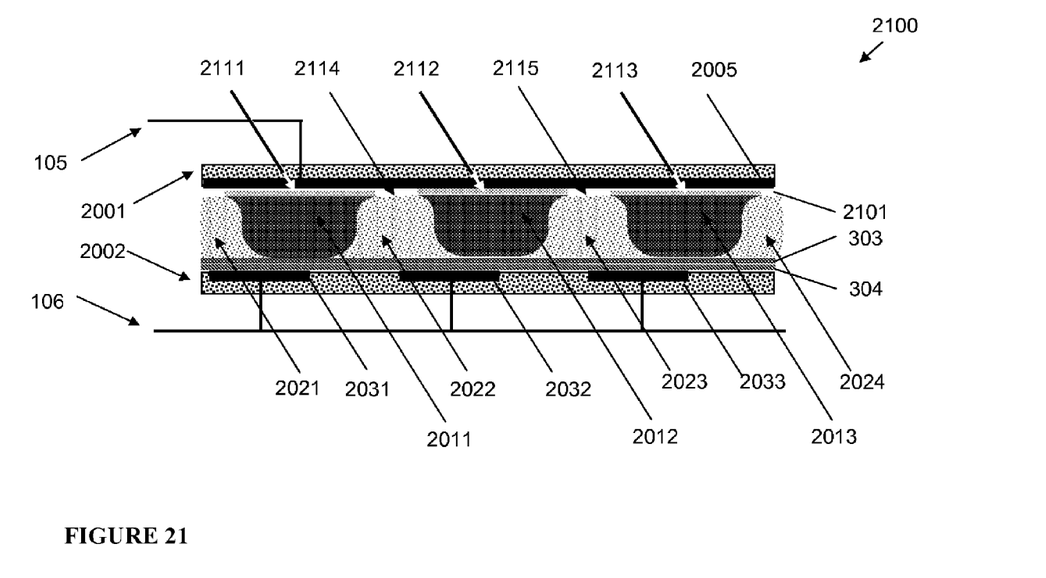
FIG. 21 presents a close-up cross-sectional view of a part of the sixth exemplary embodiment of an apparatus for converting mechanical energy into electrical energy.

FIG. 21 presents a close-up cross-sectional view of a part 2100 of apparatus 2000. It can be seen in FIG. 21 that substrate 2001 and electrode 2005 are covered by layer 2101, while substrate 2002 and electrodes 2031, 2032, 2033, 2034 are covered by a dielectric layer 304 and a contact-line-pinning-reduction layer 303. Layer 2101 consists of hydrophilic regions 2111, 2112, 2113 and hydrophobic regions 2114, 2115 which are arranged in an alternating manner. The action of surface tension forces attach conductive liquid regions 2011, 2012, 2013 to hydrophilic surface regions 2111, 2112, 2113 and dielectric liquid regions 2022 and 2023 to hydrophobic surface regions 2114 and 2115. As the result the fluidic body 2003 gets permanently attached to substrate 2001.

Actuation of fluidic body 2003 in apparatus 2000 can be done by a variety of forces applied to substrate 2001, including gravity, inertia, and pressure. Methods that can be used to extract electrical energy from apparatus 2000 are the same as those discussed in conjunction with apparatus 100 and apparatus 1200.

Figure 22:
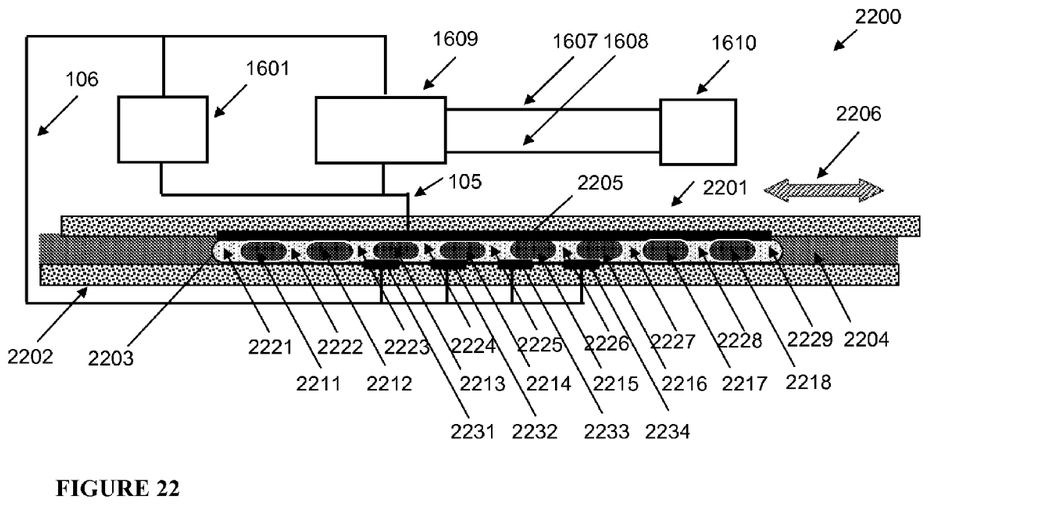
FIG. 22 presents a cross-sectional view of a seventh exemplary embodiment of an apparatus for converting mechanical energy into electrical energy.
Figure 23:
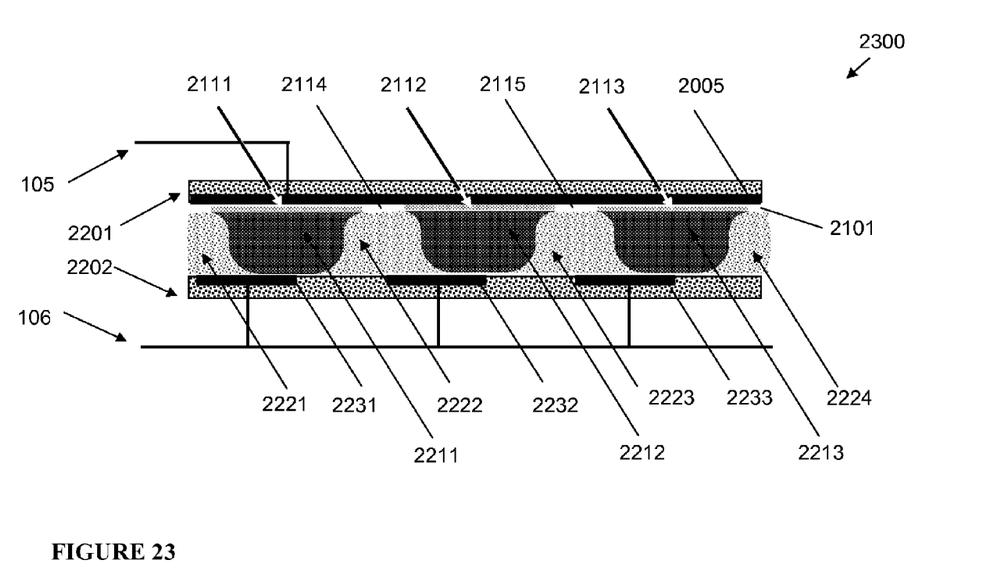
FIG. 23 presents a close-up cross-sectional view of a part of the seventh exemplary embodiment of an apparatus for converting mechanical energy into electrical energy.

FIG. 22 presents cross-sectional view of a seventh exemplary embodiment 2200 of an apparatus for converting mechanical energy into electrical energy. For simplicity, FIG. 22 present electrical connectors only schematically, not reflecting their actual physical arrangement.

The arrangement of apparatus 2000 is very similar to that of apparatus 2000, except that the phenomenon of a double-layer formation as in apparatus 1600 is employed. Similar to apparatus 2000 fluidic body 2203 is permanently attached to movable substrate 2201 by the action of surface tension forces. Similar to apparatus 1600 fluidic body 2203 is in direct contact with electrodes 2231, 2232, 2233, 2234. The electrode material and the conductive liquid material are selected to facilitate electrical double-layer formation as discussed above.

Actuation of fluidic body 2203 in apparatus 2200 can be done similar to apparatus 2000 by a variety of forces applied to substrate 2201, including gravity, inertia, and pressure. Methods that can be used to extract electrical energy from apparatus 2200 are the same as those discussed in conjunction with apparatus 1600.

Another embodiment of the current invention is a first method of use. The method comprises converting mechanical energy into electrical energy, which includes the following steps. (i) Providing circuit means for applying a bias voltage to plurality of electrodes and transferring generated electrical current from said electrodes to power consumption means. An example of those circuit means 109 and an example of power consumption means 110 are shown in FIG. 1 in conjunction with exemplary embodiment of apparatus 100. (ii) Applying a bias voltage to said electrodes and, as the result, providing electrical charge to the electrodes and generating electrical field in the space between electrodes. (ii) Reversibly moving a fluidic body comprising alternating conductive and dielectric liquid regions against electrostatic forces generated by said electrical field, thus causing multiple variations of electrical field per each cycle of reversible motion of fluidic body. Since the amount of charge on the electrodes and the field strength are intimately related, electrical field variations cause charge variations, which, in turn, can be converted into useful electrical current. (iv) Transferring electrical current generated by the multiple alternations of the accumulated charge to power consumption means.

Yet another embodiment of the current invention is a second method of use. The method comprises converting mechanical energy into electrical energy, which includes the following steps. (i) Providing circuit means for transferring generated electrical current from a plurality of electrodes to power consumption means. An example of those circuit means 1609 and an example of power consumption means 1610 are shown in FIG. 16 in conjunction with exemplary embodiment of apparatus 1600. (ii) Generating electrical field between said electrodes by forming electrical double-layer between said electrodes and a fluidic body comprising alternating conductive and dielectric liquid regions. (ii) Reversibly moving said fluidic body against electrostatic forces generated by said electrical field, thus causing multiple variations of the electrical field per each cycle of reversible motion of fluidic body. Since the amount of charge on the electrodes and the field strength are intimately related, electrical field variations cause charge variations, which, in turn, can be converted into useful electrical current. (iv) Transferring electrical current generated by the multiple alternations of the accumulated charge to power consumption means.

Yet another embodiment of the current invention is a method of manufacturing of mechanical-to-electrical energy converting device, comprising the following steps. (i) Forming a plurality of electrodes over one or more substrates. In some cases those substrates can be flexible polymeric materials, such as polypropylene, while in the other cases they might be rigid plates, such as a glass or textolite. Electrodes can be formed of various conducting materials including carbon or noble metals.

(ii) Forming a fluidic body comprising a plurality of alternating conductive and dielectric liquid regions. Examples of suitable dielectric liquids include silicone oils and alkanes. Exemplary silicone oils include polydimethylsiloxane and polydiphenylsiloxane, and exemplary alkanes include nonane and heaxadecane. Examples of suitable electrically conductive liquids include aqueous salt solutions and molten salts. Exemplary aqueous salt solutions include 0.01 molar solutions of salts such as $CuSO_4$, $LiCl$, $KNO_3$, or $NaCl$. Exemplary molten salts include 1-ethyl-3-methylimidazolium tetrafluoroborate and 1-ethyl-3-methylimidazolium trifluoromethanesulfonate, which are both commercially available. In other cases the conductive liquid can comprise liquid metals such as, gallium, indium or mercury.

(iii) Positioning said fluidic body in close proximity to said plurality of electrodes. (iv) Electrically coupling said plurality of electrodes to electrical circuit means for transferring electrical current generated by said energy converting device to power consumption means.

Although the present invention has been described in detail, those of ordinary skill in the art should understand that they could make various changes, substitutions and alterations herein without departing from the scope of the invention.

What is claimed is:

1. Method of converting mechanical energy into electrical energy comprising steps of:
    applying a bias voltage to plurality of electrodes and transferring generated electrical current from said electrodes to power consumption means;
    providing electrical charge to said electrodes and generating electrical field between said electrodes by applying said bias voltage to said electrodes;
    reversibly moving a fluidic body along the plurality of electrodes, the fluidic body comprising alternating conductive and dielectric liquid regions moving against electrostatic force generated by said electrical field generated between said electrodes, thereby causing multiple alternations of the amount of charge accumulated by said plurality of electrodes during each cycle of said reversible motion; and
    transferring electrical current generated by the multiple alternations of the accumulated charge to power consumption means during each cycle of said reversible motion.

2. Method of converting mechanical energy into electrical energy comprising steps of:
    providing plurality of electrodes and a circuit means for transferring generated electrical current from said electrodes to power consumption means;
    providing electrical charge to said electrodes and generating electrical field between said electrodes by forming an electrical double-layer between said electrodes and a fluidic body comprising alternating conductive and dielectric liquid regions;
    reversibly moving said fluidic body along the plurality of electrodes, the fluidic body moving against the electrostatic force generated by said electrical field, thereby
    causing multiple alternations of the amount of charge accumulated by said plurality of electrodes during per each cycle of said reversible motion; and
    transferring electrical current generated by the multiple alternations of the accumulated charge to power consumption means during each cycle of said reversible motion.

3. A method, comprising:
    manufacturing an energy converting device, comprising:
        forming a plurality of electrodes over one or more substrates;
        forming a fluidic body comprising a plurality of alternating conductive and dielectric liquid regions;
        positioning said fluidic body in close proximity to said plurality of electrodes;
        electrically coupling said plurality of electrodes to electrical circuit means for transferring electrical current generated by the relative movement of the fluidic body with respect to the plurality of electrodes from said energy converting device to the power consumption means.

4. The method of claim 3 further comprising a step of electrically insulating at least one of said plurality of electrodes from said fluidic body.

5. The method of claim 3 further comprising a step of disposing at least one of contact-line-pinning-reduction means on the surface of at least one of said plurality of electrodes.

6. The method of claim 3, further comprising electrically coupling said plurality of electrodes to second electrical circuit means, which is configured to apply a bias voltage to at least one electrode out of said plurality of electrodes, so as to increase the amount of charge accumulated by said at least one electrode.

* * * * *